US012741303B2

(12) United States Patent
Kendall et al.

(10) Patent No.: US 12,741,303 B2
(45) Date of Patent: Sep. 22, 2026

(54) SYSTEM FOR DEMOLITION OF BLADE OF WIND TURBINE AND RELATED METHOD

(71) Applicant: J.H. FLETCHER & CO., Huntington, WV (US)

(72) Inventors: William G. Kendall, Chesapeake, OH (US); Cassidy O'Connell, Wheeling, WV (US)

(73) Assignee: J.H. FLETCHER & CO., Huntington, WV (US)

(*) Notice: Subject to any disclaimer, the term of this patent is extended or adjusted under 35 U.S.C. 154(b) by 363 days.

(21) Appl. No.: 18/093,002

(22) Filed: Jan. 4, 2023

(65) Prior Publication Data

US 2023/0211391 A1 Jul. 6, 2023

Related U.S. Application Data

(60) Provisional application No. 63/296,318, filed on Jan. 4, 2022.

(51) Int. Cl.
*B09B 3/35* (2022.01)
*B02C 18/14* (2006.01)
(Continued)

(52) U.S. Cl.
CPC ................ *B09B 3/35* (2022.01); *B02C 18/14* (2013.01); *B02C 18/2233* (2013.01);
(Continued)

(58) Field of Classification Search
CPC ......... B09B 3/35; Y02W 30/50; Y02W 30/52; Y02W 30/62; B29B 2017/0468;
(Continued)

(56) References Cited

U.S. PATENT DOCUMENTS 1,552,553 A * 9/1925 Georgia .................. B27B 5/185 144/252.1
2011/0108648 A1* 5/2011 Woolcock .............. B02C 18/14 241/101.5
(Continued)

FOREIGN PATENT DOCUMENTS

CA 2835780 A1 * 6/2014 ........... B02C 13/286
CA 3074374 A1 * 9/2020 ............... B30B 9/32
(Continued)

OTHER PUBLICATIONS

DE 102015219412 A1 Espacenet English Translation (Year: 2017).*
(Continued)

*Primary Examiner* — Jared O Brown
(74) *Attorney, Agent, or Firm* — Dickinson Wright PLLC; Andrew D. Dorisio; Nicholas P. Coleman

(57) ABSTRACT

The system and method of processing a used wind turbine blade provides for processing of a blade at the site of the windmill rather than transporting the blade to a processing facility. The blade may be held stationary while a cutter, such as a drum or plate with cutting teeth, is moved along a portion of the blade to shred the blade. This shredding may occur within a cutting chamber. The blade may be fed into the cutting chamber with a feeder. Smaller particles may be removed or filtered from the air within the cutting chamber and larger particles may be removed and collected in a receptacle. Portions of or the entire system may be made mobile by mounting or otherwise connecting the system to a mobile support, such as a trailer.

13 Claims, 17 Drawing Sheets

(51) Int. Cl.

| | |
|---|---|
| ***B02C 18/22*** | (2006.01) |
| ***B02C 21/02*** | (2006.01) |
| ***B02C 23/24*** | (2006.01) |
| ***B29B 17/04*** | (2006.01) |

(52) U.S. Cl.
CPC .............. *B02C 21/02* (2013.01); *B02C 23/24* (2013.01); *B29B 17/04* (2013.01); *Y02W 30/52* (2015.05); *Y02W 30/62* (2015.05)

(58) Field of Classification Search
CPC .... B29B 2017/0476; B29B 2017/0484; B29B 2017/0094; B29B 17/04; B02C 18/2233; B02C 18/22; B02C 18/2225–2291; B02C 18/182; B02C 18/184; B02C 18/18; B02C 2018/0061; B02C 21/02; B02C 19/0056; B02C 19/0062; A01G 23/067
See application file for complete search history.

(56) References Cited

U.S. PATENT DOCUMENTS

| | | | | |
|---|---|---|---|---|
| 2016/0144799 | A1 * | 5/2016 | Shipman | E02F 3/963 248/647 |
| 2018/0290149 | A1 * | 10/2018 | Ver Steeg | B27L 11/005 |
| 2019/0066062 | A1 * | 2/2019 | Lilly | G06Q 10/00 |
| 2019/0070680 | A1 | 3/2019 | Lilly et al. | |
| 2020/0061725 | A1 | 2/2020 | Lilly | |

FOREIGN PATENT DOCUMENTS

| | | | | | |
|---|---|---|---|---|---|
| CN | 105881775 | A | | 8/2016 | |
| CN | 106733087 | | * | 5/2017 | B02C 18/144 |
| CN | 108000633 | | * | 5/2018 | B27B 29/02 |
| CN | 108704701 | | * | 10/2018 | B02C 19/00 |
| CN | 208343226 | U | | 1/2019 | |
| CN | 209830955 | | * | 12/2019 | B23Q 3/06 |
| CN | 209830955 | U | * | 12/2019 | |
| CN | 211590461 | U | | 9/2020 | |
| CN | 112140241 | | * | 12/2020 | B27B 29/02 |
| CN | 112140241 | A | * | 12/2020 | B27B 29/02 |
| CN | 113305354 | | * | 8/2021 | B23D 59/001 |
| CN | 113635400 | | * | 11/2021 | B27B 5/29 |
| CN | 214864269 | | * | 11/2021 | B02C 21/02 |
| DE | 4019312 | A1 | * | 12/1991 | B09B 3/32 |
| DE | 102015219412 | A1 | * | 4/2017 | B24C 1/045 |
| DE | 102021102379 | B3 | | 12/2021 | |
| EP | 2420339 | A1 | | 2/2012 | |
| EP | 3771824 | A1 | | 2/2021 | |
| FR | 2670133 | A1 | * | 6/1992 | B02C 19/0062 |
| KR | 102205132 | B1 | * | 1/2021 | B02C 18/06 |
| WO | WO-8301921 | A1 | * | 6/1983 | B27B 5/187 |
| WO | WO-9514556 | A1 | * | 6/1995 | |
| WO | 2010148418 | A1 | | 12/2010 | |
| WO | 2017194208 | A1 | | 11/2017 | |
| WO | 2021191296 | A1 | | 9/2021 | |
| WO | 2021207476 | A1 | | 10/2021 | |

OTHER PUBLICATIONS

Wind turbine blade recycling: Experiences, challenges and possibilities in a circular economy; J.P. Jensena, K. Skeltona; Department of Development and Planning, Rendsburggade 14, 9000 Aalborg, Denmark Siemens Gamesa Renewable Energy, Fiskergade 1-9, 7100 Vejle, Denmark.

Renewable Energy Focus Kari Larsen; Jan./Feb. 2009.

* cited by examiner 122
133
C
131

133
C
131

SYSTEM FOR DEMOLITION OF BLADE OF WIND TURBINE AND RELATED METHOD

CROSS-REFERENCE TO RELATED APPLICATIONS

This application claims priority to U.S. PROVISIONAL Patent Application Ser. No. 63/296,318, filed Jan. 4, 2022, the disclosure of which is incorporated herein by reference.

TECHNICAL FIELD

This application relates to a system and device for handling and demolition of a blade of a wind turbine.

BACKGROUND

Wind energy has become an increasingly important source of renewable energy in recent years, with windmills being a common sight in many parts of the world. These windmills consist of large blades that rotate to capture the wind's energy and convert it into electricity. However, the blades have a limited lifespan and must be disposed of after a certain number of years.

The disposal of used windmill blades poses a significant challenge due to their size and composition. The blades may be 200 feet long or more, may be 15 feet or more in diameter, and may weigh 10 tons or more. They are typically made of fiberglass or other composite materials, which makes them difficult to recycle or repurpose. As a result, they are often sent to landfills, where they take up valuable space and may pose environmental hazards.

Even if a blade is cut into smaller pieces for transport and disposal, such cutting and coordination of transport incurs significant cost of labor, crane costs (for moving large blade pieces), and transportation to a disposal facility. Furthermore, the blades often are made of materials such as fiberglass, carbon fiber reinforced epoxy, foam stiffeners, resin and fiber laminates, wood, and structural adhesive. These materials can be hazardous and/or potentially carcinogenic, especially during cutting or other demolition of the blade (such as for easier transport). These materials of a blade make further demolition, such as shredding of the blade, hazardous and/or impractical, as facilities that may be capable of such shredding are either non-existent or have permanent locations, causing expensive transport and handling of blades to such facilities impractical.

The disposal of used windmill blades in landfills has a negative impact on the environment in several ways. First, it contributes to the growing problem of waste disposal, due at least to the substantial size of the blades. Not to mention that the blade surfaces are often slippery, thereby creating potentially hazardous conditions for dozers or compactors which try to crush, compact, or cover the blades with dirt. Second, the materials of the blades are often not easily degraded or decomposed, and may remain in the disposed-of state essentially indefinitely. Third, the disposal of used blades in landfills deprives society of the opportunity to recycle or repurpose the materials for other uses.

To address this problem, this patent application proposes a new method for disposing of used windmill blades in an environmentally responsible manner. The proposed method involves a portable system capable of breaking down the blades into their component materials, which can then be safely and efficiently be transported to and disposed of in landfills or recycled or repurposed for other uses. This will reduce the amount of space used in landfills and/or reduce the overall waste sent to landfills. Moreover, this portable, complete system for processing of a used wind turbine blade allows for the prevention of the release of harmful dust and particulates into the environment. Thus, the proposed system allows for transportation of the blade processing system to the turbine or blade location, and then the complete processing of a fully intact blade without transportation or rehandling of the blade.

In addition to its environmental benefits, this method also has the potential to be economically viable. By breaking down the blades into their component materials, it may be possible to recover valuable resources that can be used in other industries. This could generate additional revenue streams and help to offset the costs of the disposal process. Overall, this method represents a significant advancement in the field of wind energy and could help to make wind power a more sustainable source of energy in the future.

SUMMARY

In one aspect, a system is disclosed for processing a used wind turbine blade. The system comprises at least one gripper adapted to grip and hold the blade stationary, at least one cutter adapted to shred the blade, and a cutter support adapted to move the cutter with respect to the blade to process the blade.

In one aspect, the cutter may be housed within a cutting chamber. The system may further include a dust collector in communication with the cutting chamber for removing small particles from the air within the cutting chamber.

In one aspect, the cutter support may include at least one beam, and the cutter may be adapted to move along the beam as the cutter shreds the blade. The system may include a drive for moving the cutter along the cutter support.

In a further aspect, the cutter may comprise a cutter frame and a cutter head. The cutter head may include a rotatable drum comprising a plurality of teeth. The frame may include a window on a lateral side thereof, the window being adapted to receive the blade as the cutter moves along the cutter support. In another aspect, the cutter frame comprises a blade support adapted to guide the blade into the window as the cutter moves along the cutter support.

In one aspect, a feeder may be provided for feeding the blade to the cutter. The feeder may be adapted to move with respect to the gripper in a feeding direction, such as along a longitudinal length of the blade. An actuator may move the feeder with respect to the gripper. One or both of the feeder and the gripper may be actuable clamps.

In one aspect, a discharge conveyor may be provided to receive processed pieces of the blade from the cutter and transport said processed pieces to a receptacle.

In one aspect, a mobile support, such as a trailer, may be provided for supporting and transporting the cutter and the cutter support.

In another aspect, a method is disclosed for processing a used wind turbine blade. The method may include gripping the blade and holding the blade stationary and moving a cutter along the blade to shred at least a portion of the blade. This may include moving the cutter along a cutter support in a direction transverse to a length of the blade. In one aspect, the method may further include feeding the blade in a feeding direction toward the cutter. This feeding of the blade may comprise clamping the blade with a clamp and moving the clamp toward the cutter.

In another aspect, the moving of the cutter and the shredding of the blade occurs in a cutting chamber. The cutting chamber may be attached to a dust collector, such as a vacuum for collecting debris from the shredding of the blade.

BRIEF DESCRIPTION OF THE DRAWINGS

Further characteristics and advantages of the invention will become apparent in the description of non-exclusive embodiments of the system, illustrated—by way of a non-limiting example—in the drawings attached hereto, in which.

DETAILED DESCRIPTION

Figure 1:
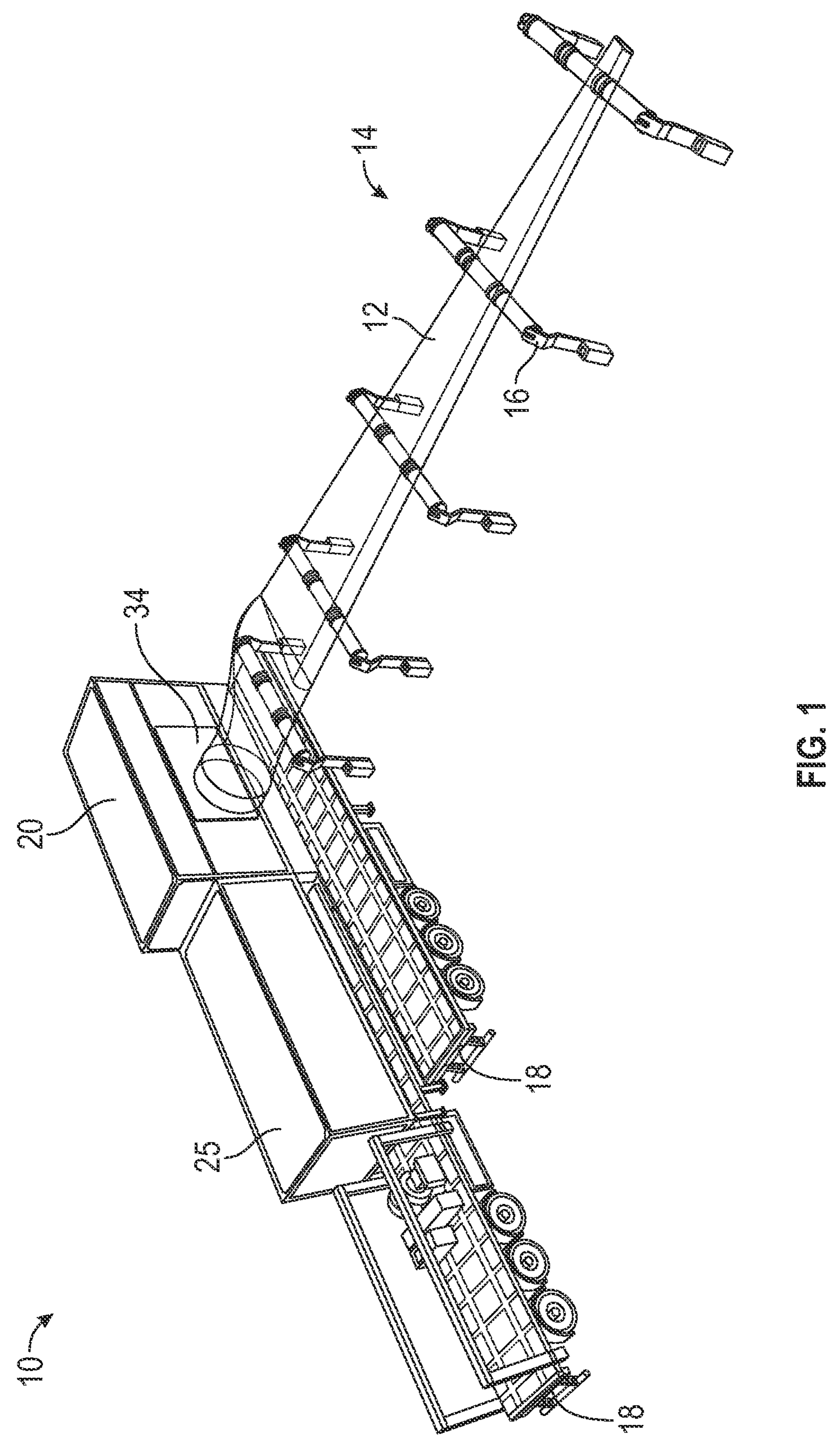
FIG. 1 is a perspective view of a first embodiment of a system for processing a used wind turbine blade.
Figure 2:
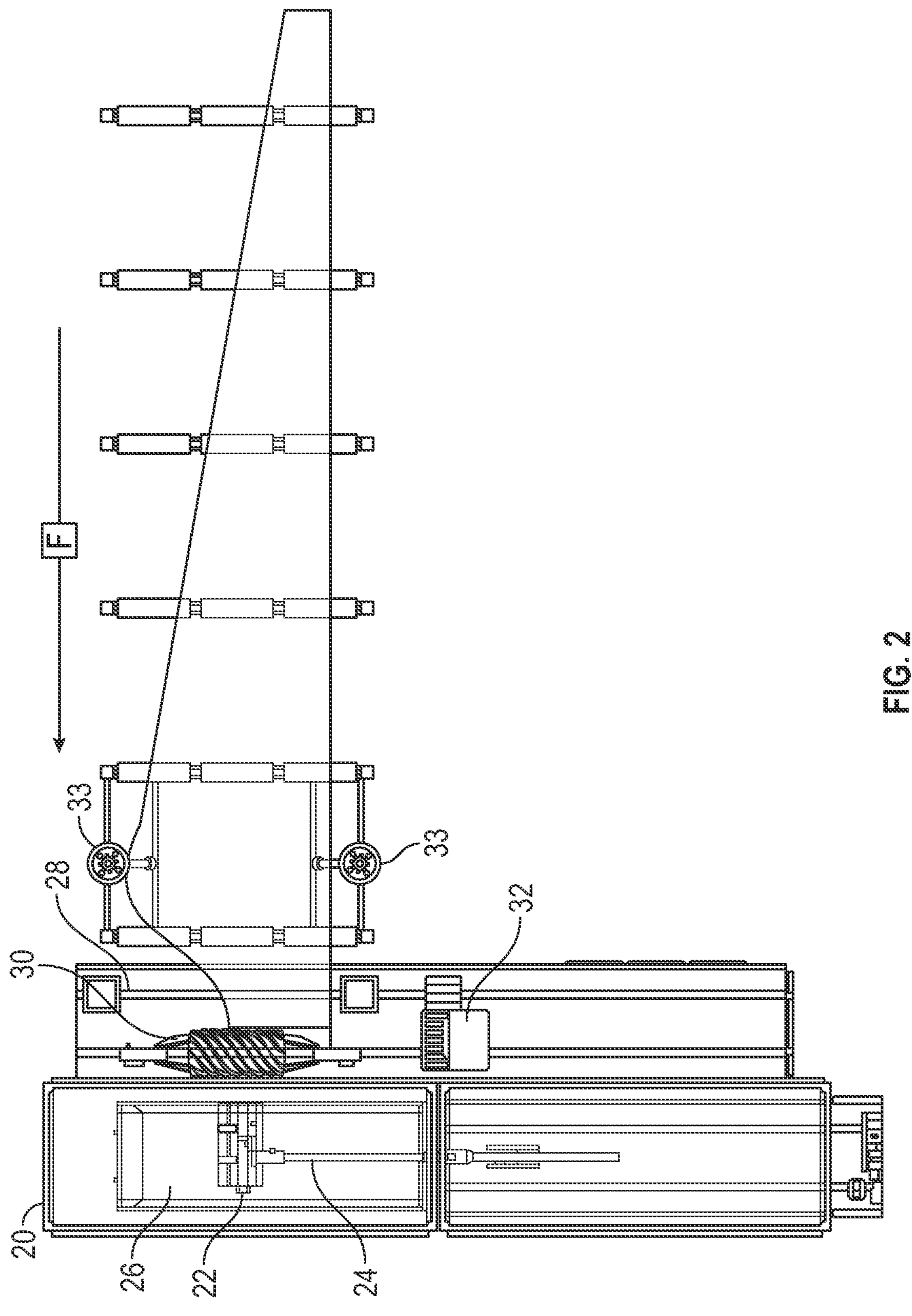
FIG. 2 is a top plan view of the system of FIG. 1.
Figure 3:
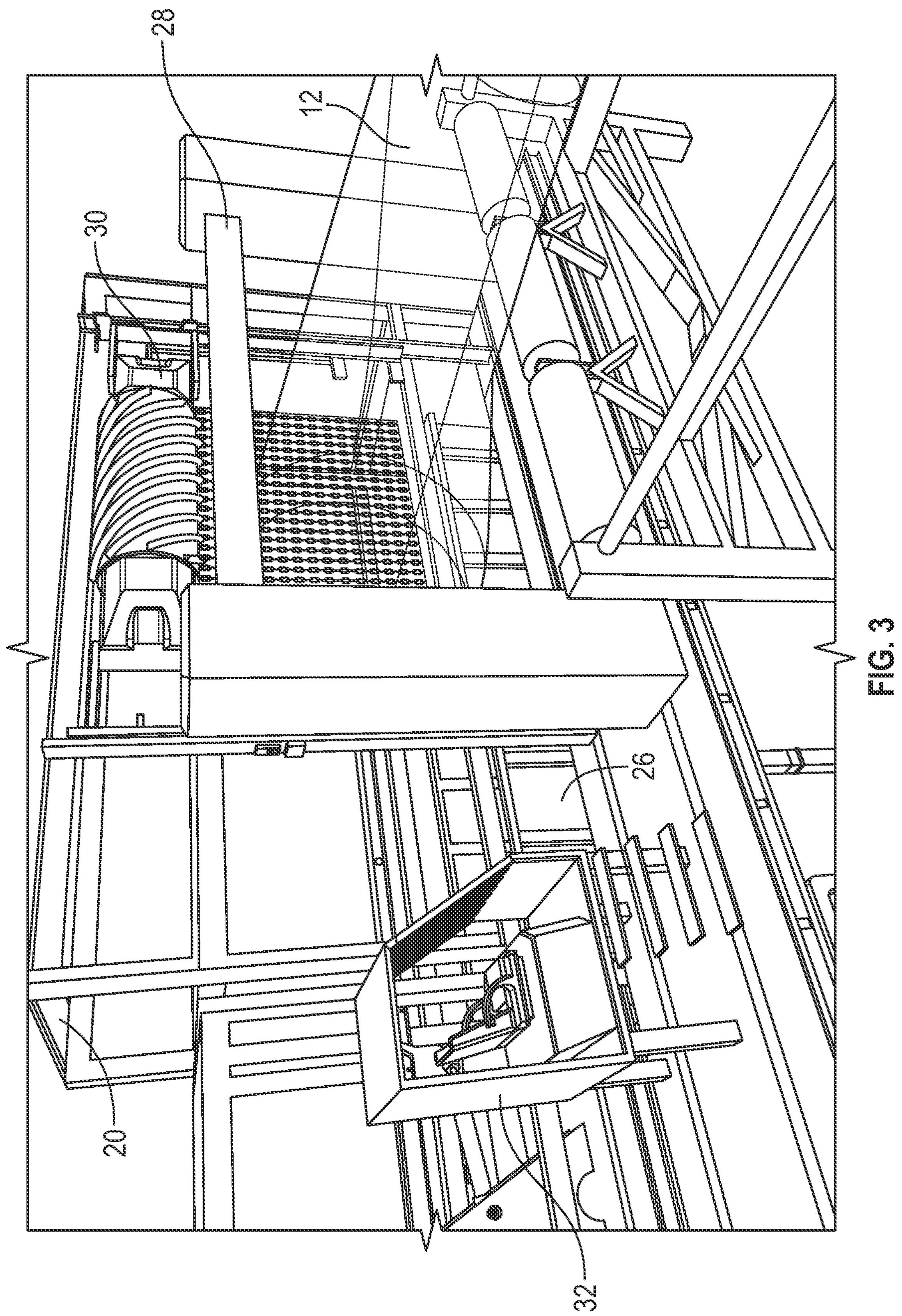
FIG. 3 is a perspective view of a cutter of the system of FIG. 1.

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized, and that process or other changes may be made without departing from the scope of the disclosure. The following detailed description is not to be taken in a limiting sense, and the scope of the invention is defined only by the appended claims and their equivalents. In accordance with the disclosure, a system for processing and/or disposing of large-scale items such as wind turbine blades is hereinafter described.

Reference is now made to FIGS. 1-6, which illustrate one embodiment of a blade processing system 10. The system 10 is adapted for processing a blade 12 or other large item, including for cutting or shredding the blade 12 for disposal or recycling.

The system 10 may include a cutting chamber 20, which may be adapted for receiving the blade 12 for processing. The cutting chamber 20 may include at least one first cutter 22 for cutting the blade 12. The first cutter 22 may be a shredder adapted to break the blade 12 or large pieces thereof into smaller parts, such as shards, pellets, chips, shavings, or other smaller pieces for easy transport to a secondary location for disposal, recycling, or other further use. The cutting chamber 20 may include one or more sensors, such as video cameras or other monitoring device, to allow for remote operation and visualization and/or for automation.

A dust barrier 34 may be provided at an entrance to the cutting chamber 20 as a means of preventing or inhibiting escape of dust or other small particulates that are a result of processing the blade 12. The dust barrier may comprise a flap, a shroud, a curtain, a vacuum for providing a negative pressure within the cutting chamber 20, or any other barrier to inhibit the escape of dust.

In a further aspect, a dust collector may be provided with the system 10. For example, the dust collector may be adapted to create a negative pressure within the cutting chamber 20, and thus remove any airborne particulates and small particles that do not fall from the first cutter. The dust collector may comprise one or more filters or filtering means for removing dust and small particulates from the air. The dust collector may comprise a reverse pulse filtration system for automatic filter cleaning. In a non-limiting example, the dust collector may be rated at between 15,000-20,000 cfm. The dust collector may comprise one or more filters rated for use with fine fiberglass dust. The cutting chamber 20 may include the vacuum system needed to create the dust collector, or a separate dust collector may be fluidly connected to the cutting chamber.

The first cutter may be connected to a boom 24 or other mechanism to provide vertical and horizontal movement. The boom 24 may allow the first cutter 22 to be articulated in a plurality of directions or about a plurality of axes to provide access of the first cutter 22 to different parts of the blade 12. For example the boom 24 may be adapted to extend and retract the first cutter 20 in a direction along a longitudinal axis of the boom. The boom 24 may be adapted to pivot about one or more joints of the boom so as to move the first cutter 22 vertically and/or horizontally. In one aspect, the boom may include a joint that is adapted to pivot the first cutter about an axis transverse to or perpendicular to the longitudinal axis of the boom. The boom 24 may be further adapted to rotate the first cutter 22 about the longitudinal axis of the boom. Thus, the boom 24 may allow the first cutter 22 to reach any portion of the blade 12 introduced into the cutting chamber 20. This may allow movement of the first cutter to correspond to a thickness of the blade 12, such that the first cutter may be moved across an entire thickness of the blade in order to process the entire blade.

In some embodiments, the cutting chamber 20 may include a plurality of first cutters 22. For example, a first cutter 22 may be positioned on a top of the blade, and a first cutter 22 may be positioned on a bottom of the blade. This may allow for a more efficient processing of the blade. The plurality of first cutters 22 may be provided on a single boom, or a plurality of booms may be provided in association with the plurality of first cutters 22.

Figure 4:
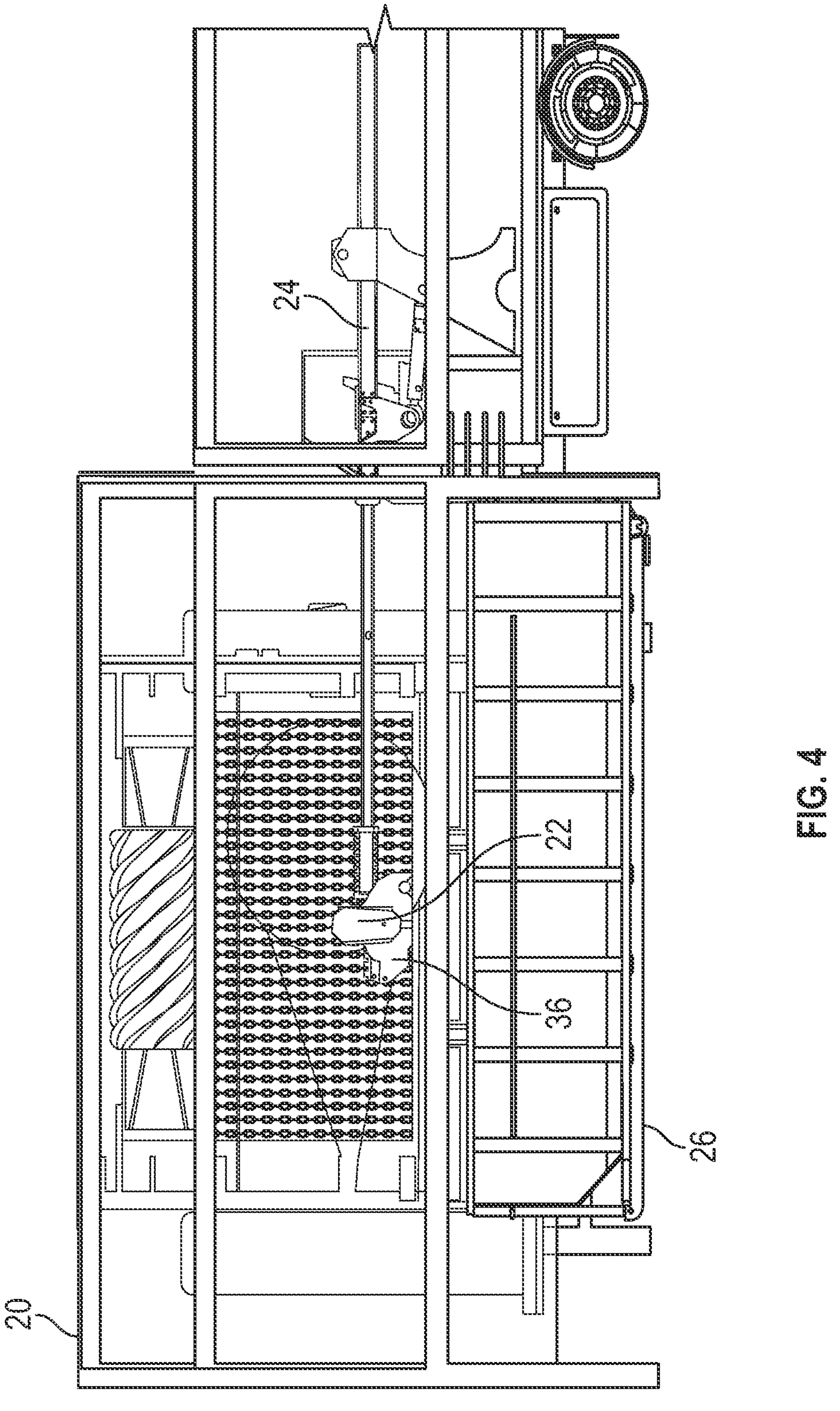
FIG. 4 is a rear elevational view of a cutting chamber of the system of FIG. 1 with partially see-through walls.
Figure 5:
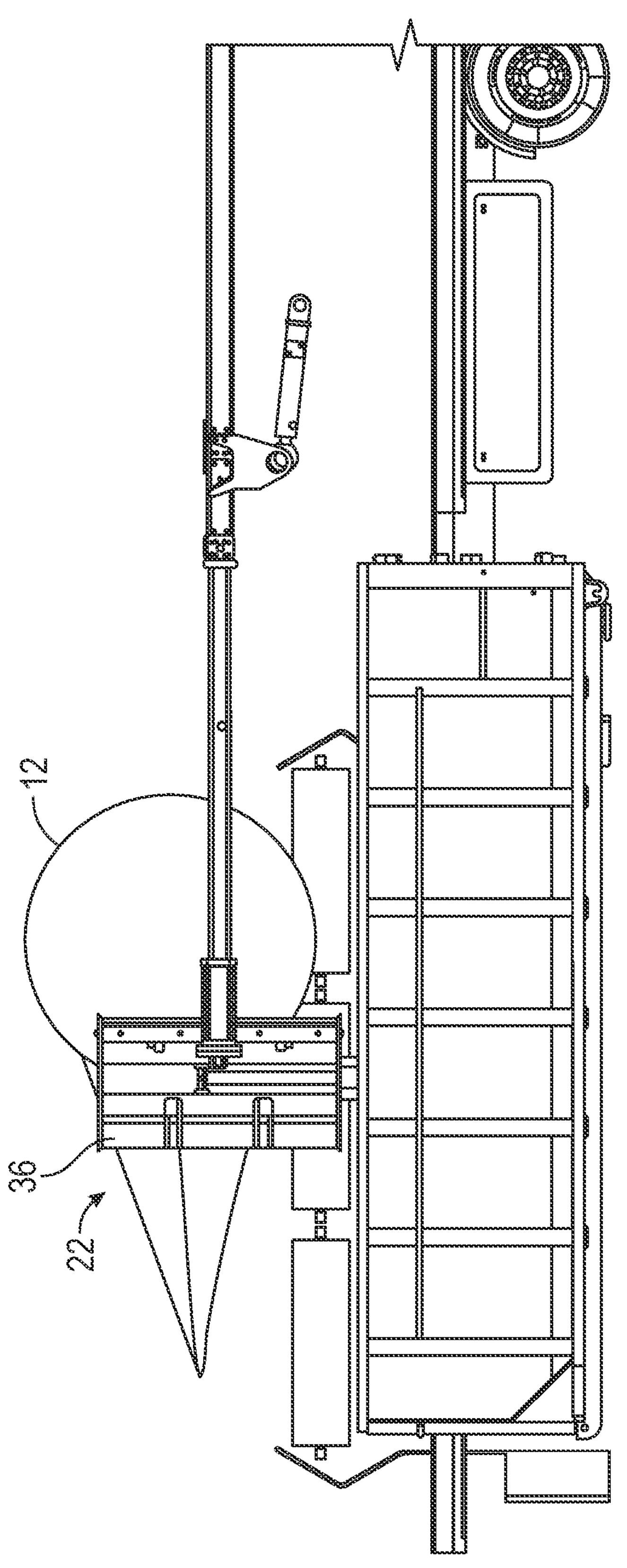
FIG. 5 is a further rear elevational view of the system as disclosed in FIG. 4 with the walls removed.
Figure 6:
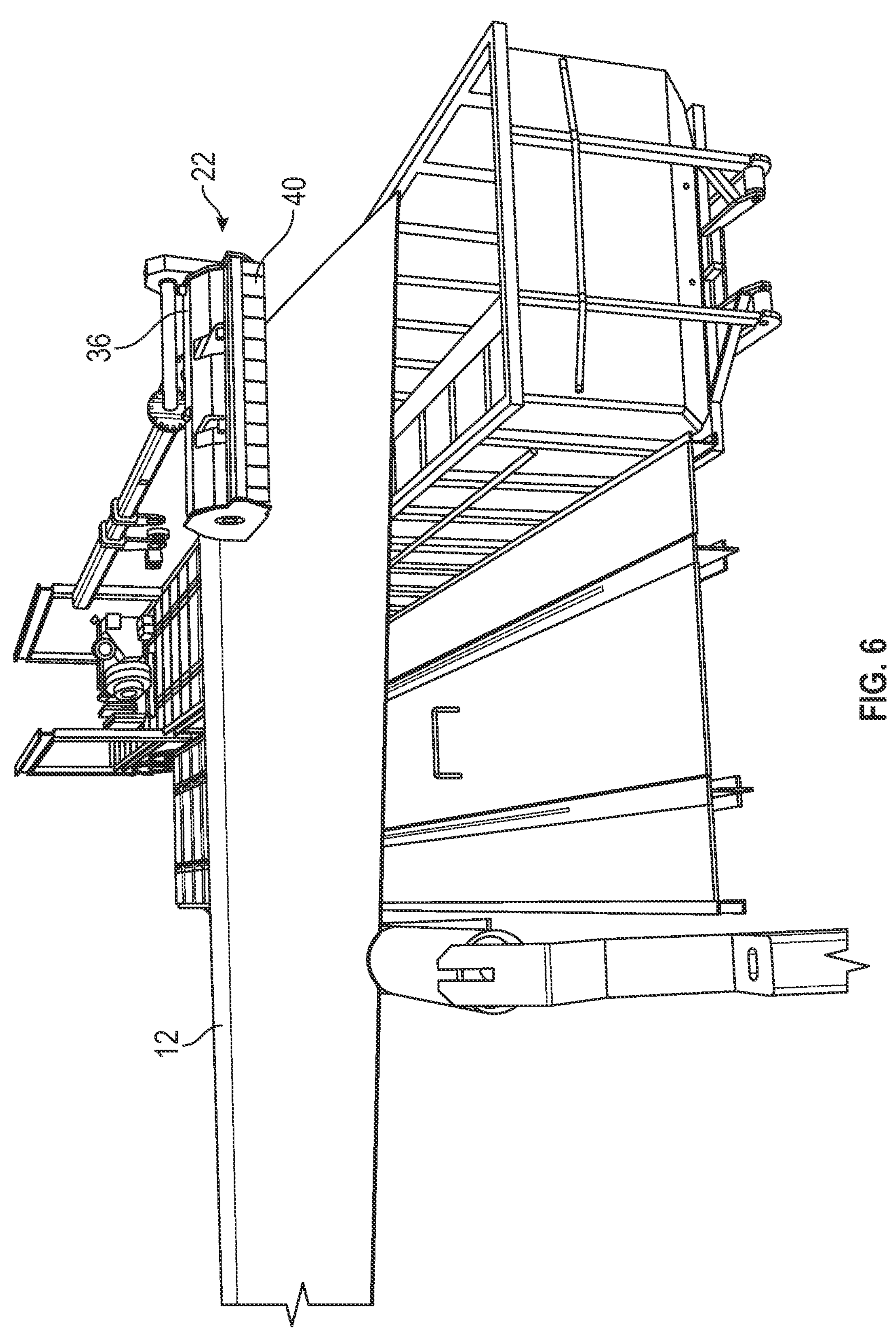
FIG. 6 is a top perspective view of the cutter of the system of FIG. 1 with the walls of the cutting chamber removed.

With reference to FIG. 6, the first cutter 22 may comprise a cutter shroud 36, which may at least partially surround or house a cutter head 40. The boom 24 may allow the cutter shroud 36 to be oriented so as to have the cutter head 40 engage the blade 12 for processing in different orientations. As can be seen in FIG. 4, the cutter shroud 36 may orient the cutter head downward. This may be advantageous as it allows the cutter head 40 to engage the blade for processing along a top surface of the blade 16. As shown in FIG. 5, the cutter shroud 36 may be rotated to engage the blade 12 for processing in another orientation, such as along an end of the blade. This may allow the blade 12 to be fed directly into the cutter head 40.

Furthermore, the shroud can aid in sizing of the cut material by forcing large chunks to be captured and cut between the cutter and the shroud. The shroud can also provide a support for thin sections of the blade to guarantee that they are cut rather than simply bending away from the cutter.

In one aspect, the system 10 may include one or more sensors for sensing a proximity of the first cutter to the blade. The system 10 may include a controller adapted to receive a signal from the one or more sensors and maintain a preset or predetermined distance from the blade during operation of the first cutter. Accordingly, the system may be adapted to cause the first cutter to follow a contour of the blade.

Figure 7A:
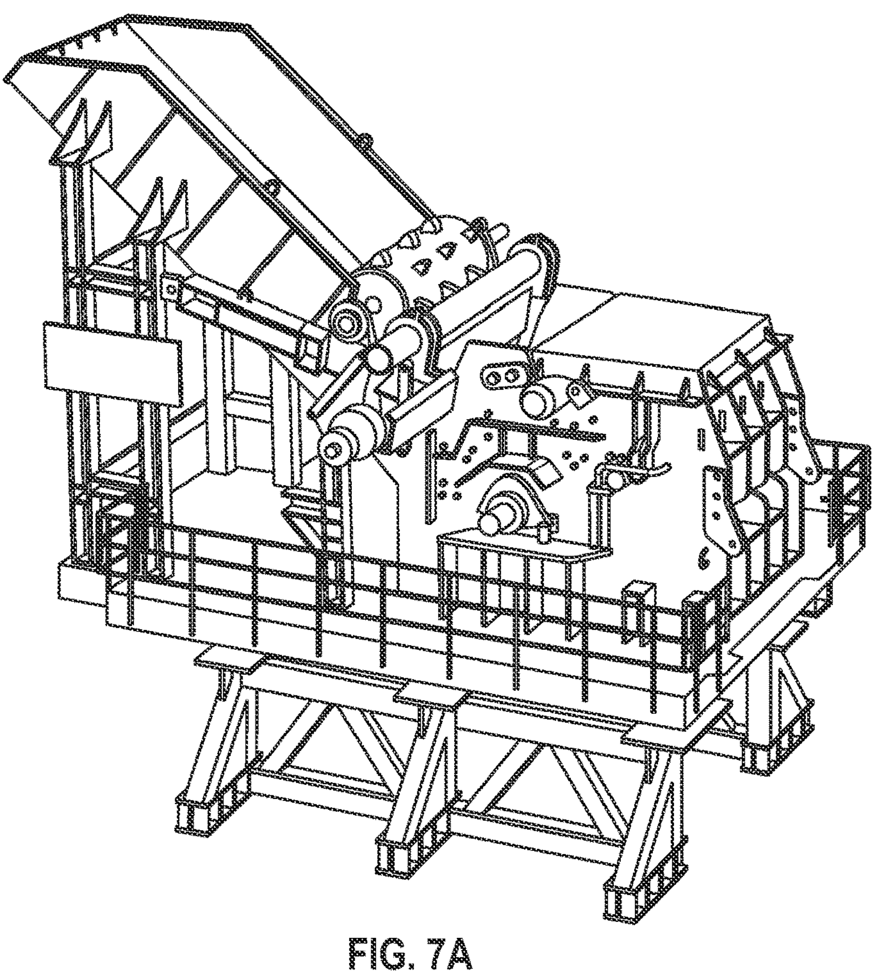
FIGS. 7*a*-7*c* are various cutter heads which may be used in the system of FIG. 1.
Figure 7B:
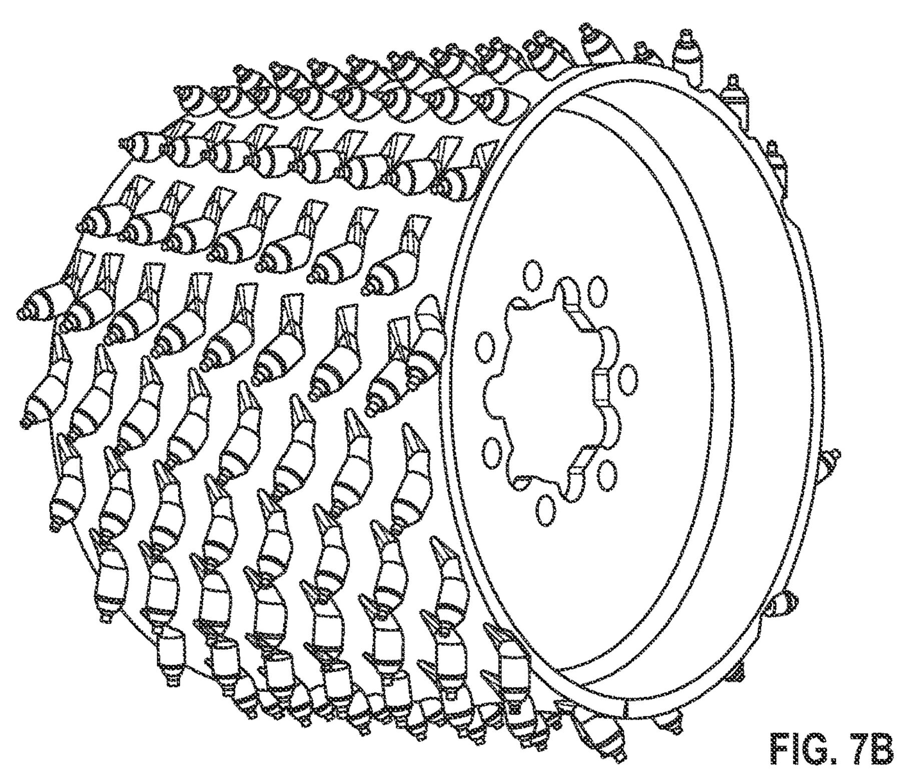
Figure 7C:
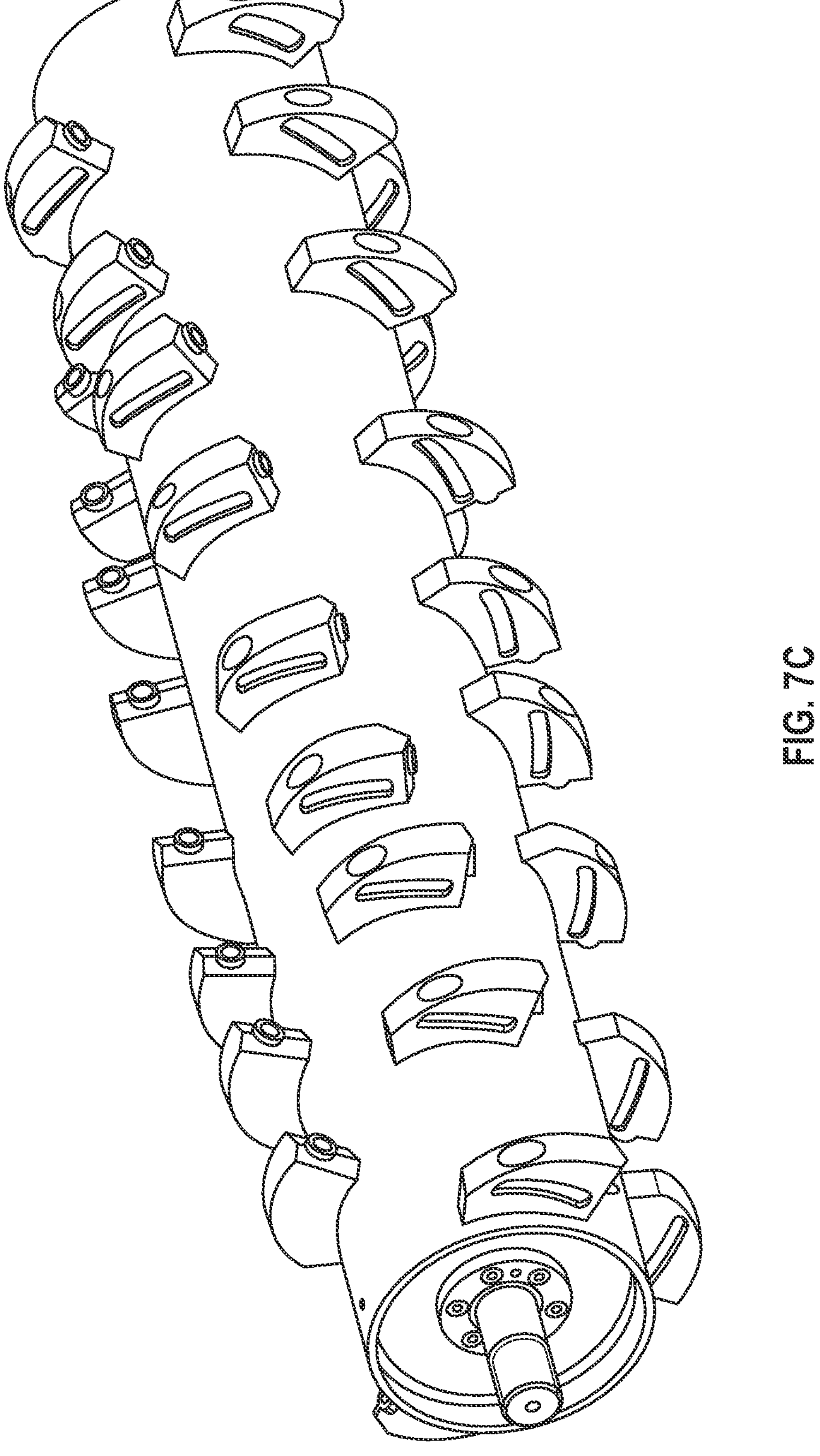
Figure 8:
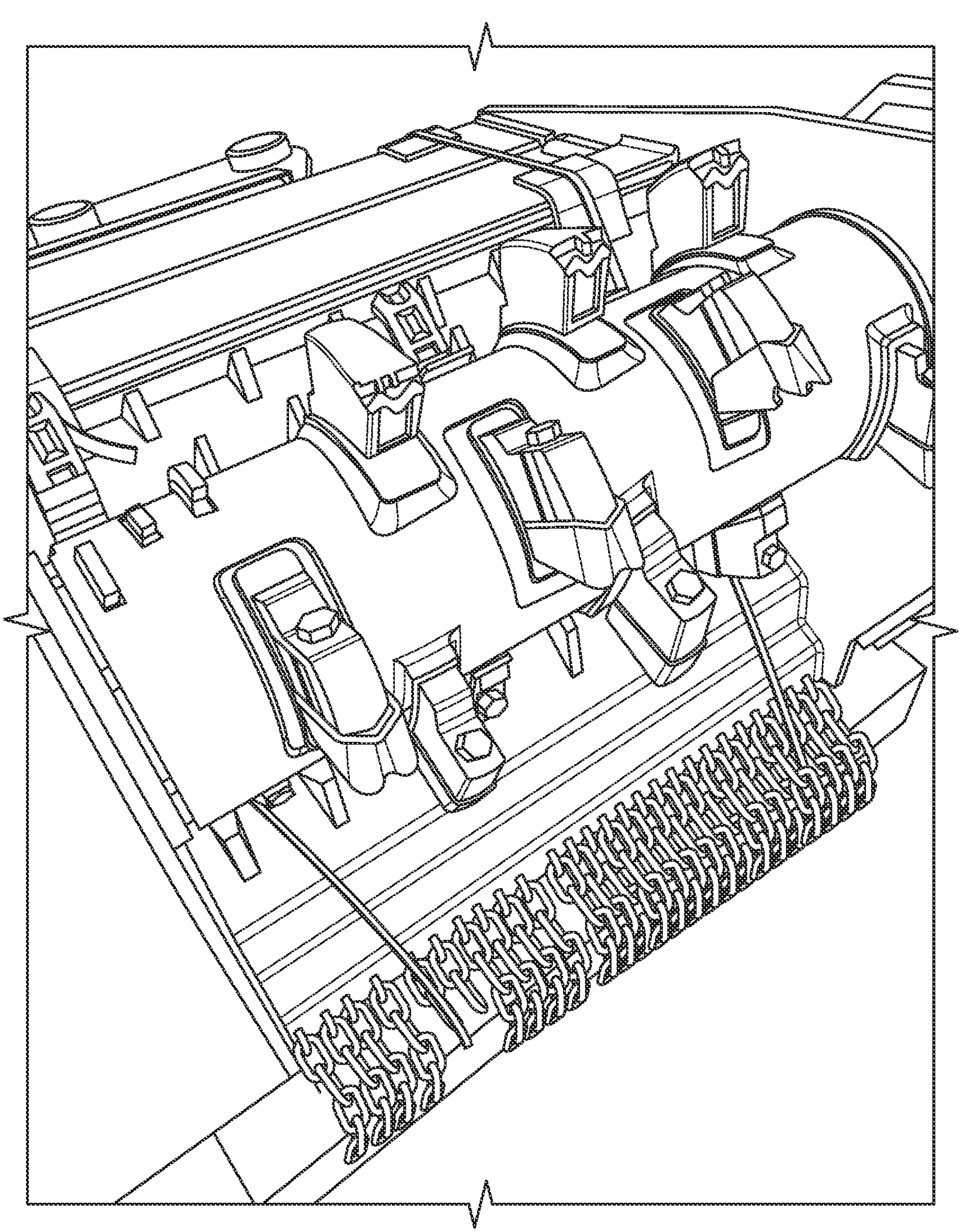
FIG. 8 is a cutter head within a shroud of the system of FIG. 1.

Various types of cutter heads may be used for processing the blade 12. For example, as shown in FIG. 7*a*, the cutter head or drum of a slow speed shredder, such as the large stationary industrial shredders may be used. As shown in FIG. 7*b*, the cutter head or drum of a concrete milling machine may be used, which operates as a medium speed and requires a relatively high torque. As shown in FIG. 7*c*, a cutting head or rotor such as is used in a forestry mulching machine may be used, which operates at a high speed but a low torque. FIG. 8 illustrates such a cutter head within a shroud.

Figure 9A:
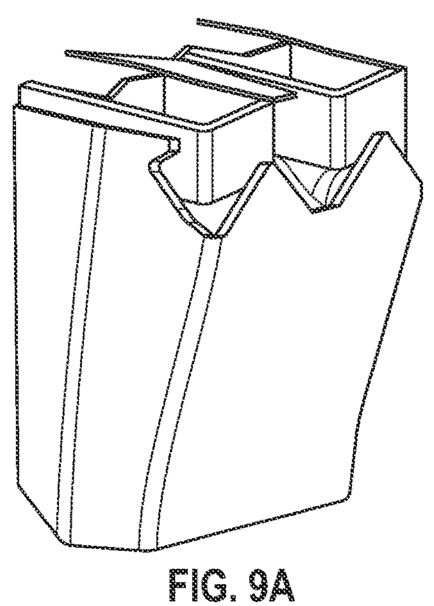
FIGS. 9*a*-9*e* are various teeth or bits that may be used in association with the cutter head of the system of FIG. 1.
Figure 9B:
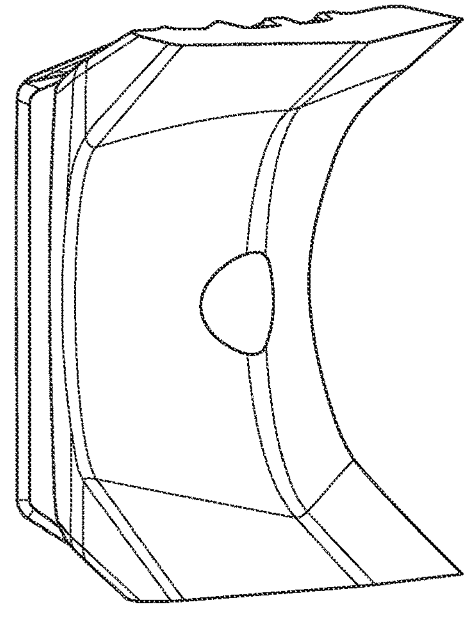
Figure 9C:
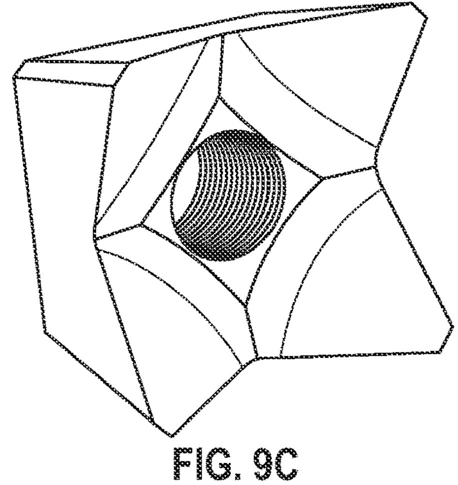
Figures 9D, 9E:
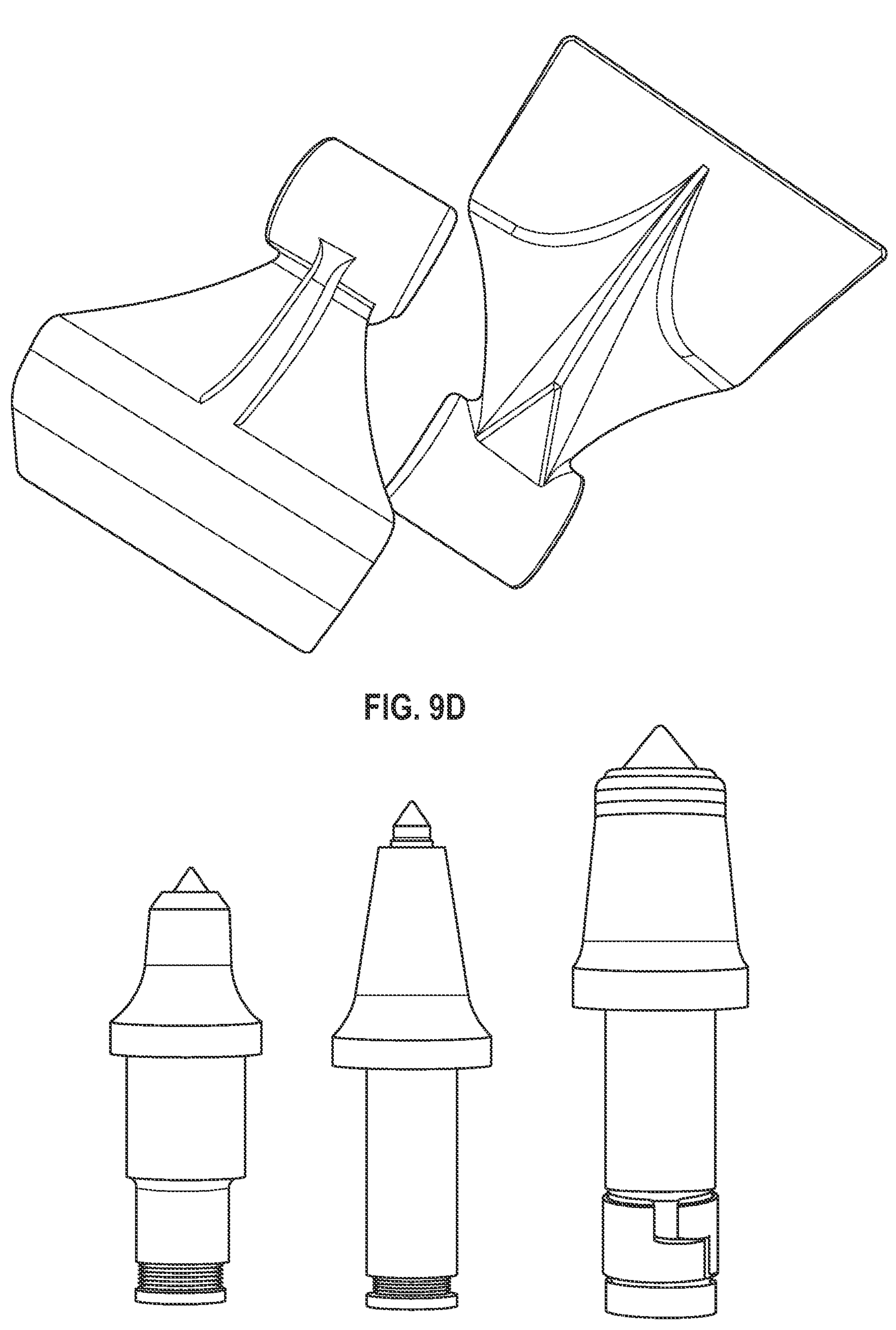

With reference to FIGS. 9*a*-9*e*, one or more teeth, tips, or bits may be attached to the cutter head to assist in processing the blade. For example, the system may use a double carbide cutting bit (FIG. 9*a*), a Viking sword bit (FIG. 9*b*), a QUADCO Beaver bit (FIG. 9*c*), flail cutters (FIG. 9*d*), or rock mining bits (FIG. 9*e*).

During the processing of the blade, the feed rate of the blade 12 to the first cutter 22 may be adjusted to optimize cutting speed without overloading the cutter. This adjustment of the feed rate of the blade may be conducted manually by an operator, or may be automatic within the system. In the automatic mode, the system 10 may include one or more sensors to sense a load on or a torque induced by the first cutter. If the load or torque exceeds a predetermined or preset amount, then a feed rate of the blade may be decreased until the load or torque is below a threshold value to maximize overall efficiency.

When not in use, the boom 24, with or without the first cutter 22 attached, may be stored or transported within a boom storage chamber 25. In one aspect, the boom 24 may be mounted within the boom storage chamber 25. The boom storage chamber 25 may be connected to the cutting chamber 20 such that the boom 24 may extend from the boom storage chamber 25 into the cutting chamber 20.

A receptacle 26 may be provided to collect the pieces of the blade 12 after they have been processed by the first cutter 22. This receptacle 26 may be a normal dumpster, such as a 30 yard dumpster that is known in the art and may be transported by forklift and/or tractor-trailer. The receptacle may be located below the cutting chamber 20, so that processed pieces of the blade 12 may simply fall into the receptacle 26. In one aspect, the cutting chamber may be open at the bottom to allow processed pieces of the blade 12 to fall freely into the receptacle 26. In another aspect, the cutting chamber 20 may have a retractable base or an openable and closable aperture in its bottom to allow processed pieces of the blade to be selectively emptied from the cutting chamber 20 into the receptacle.

In another aspect, the system 10 may include a conveyor 14, such as a blade feed system. This conveyor 14 may be adapted to feed the blade 12 to the cutting chamber 20 for processing, such as in a feed direction F. This conveyor 14 may comprise one or more rollers 16, which may support the blade 12 at a desired height to facilitate loading the blade into the cutting chamber. The conveyor 14 may be adjustable in height to facilitate such loading at different heights, depending on blade size, size, height, or door size of the cutting chamber, or to account for uneven ground surrounding the cutting chamber.

One or more feeders 30 may further assist in feeding the blade 12 into the cutting chamber 20. For example, feeder 30 may comprise a feed roller. The feeder 30 may contact the blade 12 and push the blade into or toward the cutting chamber 20. In one aspect, the feed roller may include a gripping surface, such as knurling, teeth, or a helical groove to provide additional friction against the blade 12.

One or more lateral rollers 33 may be provided to further assist in moving the blade 12 toward the first cutter 22 in the cutting chamber 20. These lateral rollers 33 may comprise a pair of pinch rollers adapted to contact or grip a lateral side of the blade 12. These lateral rollers 33 may be adapted to move toward and away from each other so as to grip the blade 12 at different lateral widths of the blade. This is particularly helpful as the blades of wind turbines may have a non-uniform profile, as can most easily be seen in FIG. 2.

In yet another aspect, one or more second cutters 28 may be provided. The second cutter 28 may be adapted to remove any portion of the blade 12 that will not be processed by the first cutter 22. For example, the hub portion of the blade (or the portion of the blade that connects to the hub of the wind turbine) may be removed prior to processing the remainder of the blade.

This second cutter 28 may be adapted to break the blade 12 down into smaller pieces that are more easily processed by the first cutter 22. For example, the second cutter 28 may comprise a cutoff saw, such as a chainsaw (which may be arranged to cut in a vertical direction), a laser, or any other cutting device for breaking the larger blade 12 into pieces of sufficiently small size to be introduced into the cutting chamber 20.

The system 10 may further include an operator cab 32, which may comprise one or more controls for operating one or more elements of the system 10 described herein. The operator cab 32 may include air processing, such as a filtration and/or HVAC system, noise insulation, appropriate lighting, sensors, and controls. The operator cab 32 may be fixed in a position sufficiently distanced from the first cutter and/or the second cutter to protect an operator from flying debris during processing of a blade 12.

In a further aspect, the system 10 may be portable or mobile. For example, one or more of the elements of the system 10 may be mounted on or transported via mobile supports 18, such as trailers. These trailers may be adapted for tow-behind standard tractor rig or semi-truck. Accordingly, one or more of the elements of the system 10 described herein, including the entirety of the system 10 described herein, may be transported to a site of a wind turbine. Thus, a used blade 12 that has been removed from the wind turbine may be processed by the system at the location of the wind turbine, rather than transported to a different facility, thereby avoiding expensive transportation costs associated with transporting a wind turbine blade.

With further reference to FIGS. 10-16, a second embodiment of a blade processing system 100 is disclosed. The system 100 may include a cutting chamber 120, which may be adapted for receiving the blade 112 for processing. The cutting chamber 120 may include a cutter 122, which is discussed in further detail below, for cutting the blade 112. The cutter may be adapted to break the blade 112 or large pieces thereof into smaller parts, such as shards, pellets, chips, shavings, or other smaller pieces for easy transport to a secondary location for disposal, recycling, or other future use. One or more sensors, such as video cameras or other monitoring device, may be present in the cutting chamber 120 to allow for remote operation and visualization and/or for automation. For example, an operator's cab 132 may be provided for allowing an operator to control one or more (or all) aspects of the system 100.

In one aspect, the system 100 may be mobile, so that it may be transported to the location of a wind turbine blade for processing. For example, the system 100 may include one or more mobile support 118, such as a trailer. The trailer may be a tow-behind style trailer, such as one that is standard for a tractor rig or semi-truck.

Figure 10:
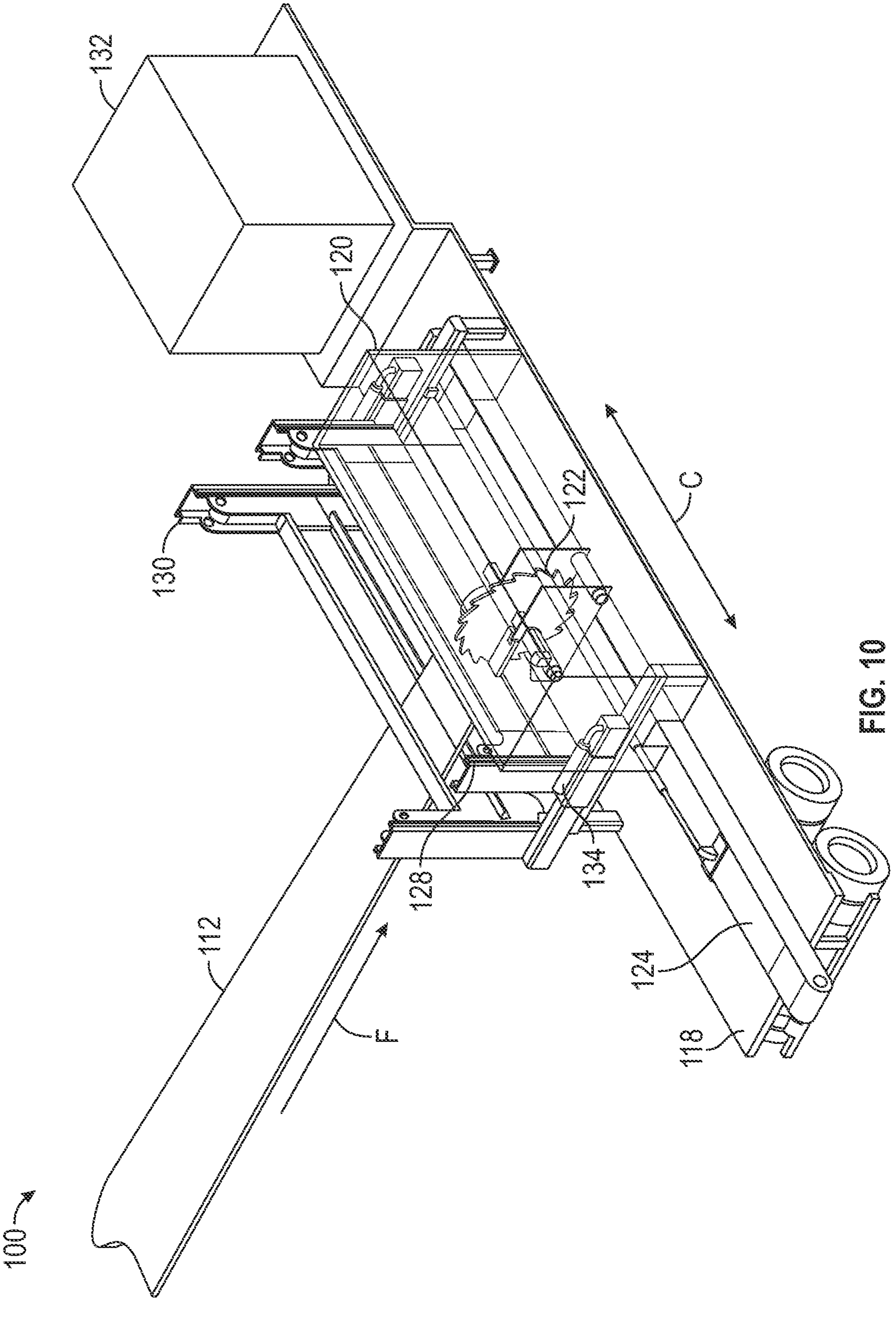
FIG. 10 is a top perspective view of a second embodiment of a system for processing a used wind turbine blade.

The system 100 may include a gripper 128, such as a grip press, adapted for holding the blade 112 while the cutter 122 processes at least a portion of the blade 112. As illustrated in FIG. 10, the gripper 128 may be positioned or positionable at an entrance of the cutting chamber 120. The gripper 128 may act as a dust barrier for the cutting chamber 120 to prevent or inhibit the escape of dust or other small particles that are a result of processing the blade 112. In one aspect, a separate dust barrier, such as a flap, a shroud, a curtain, or any other barrier may be present to inhibit the escape of such dust and particles.

Figures 11A, 11B:
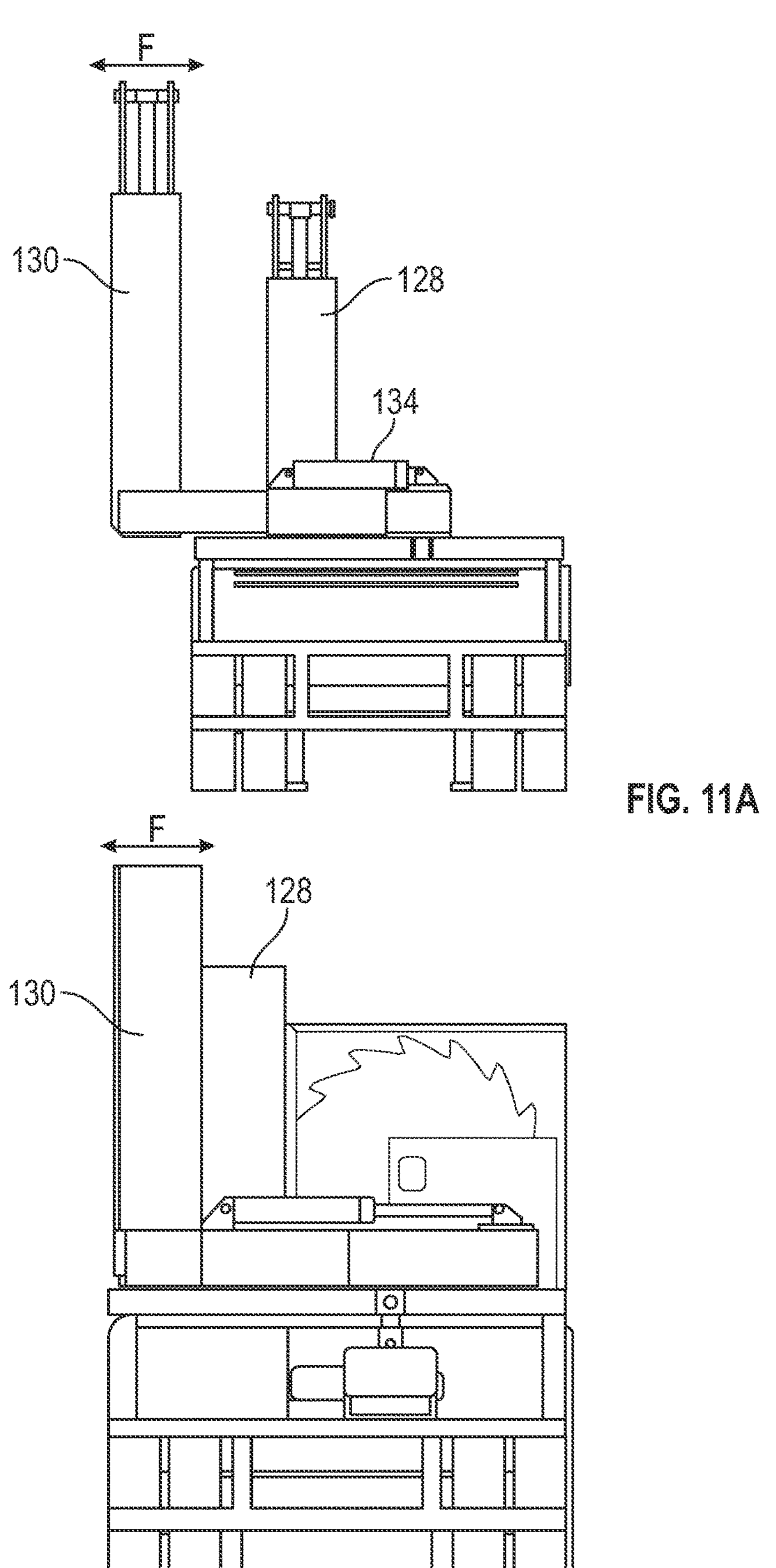
FIGS. 11*a*-11*b* is an elevational view of a gripper and a feeder of the system of FIG. 10.

A feeder 130, such as a feed press, may be provided for feeding the blade 112 along a feed direction F into the cutting chamber 120. The feeder 130 may be mobile or otherwise movable, such as by an actuator 134, in order to effectuate the movement of the blade 112 into the cutting chamber 120. The actuator 134 may comprise a hydraulic cylinder or other driving mechanism for moving the feeder 130 along the feed direction F back and forth with respect to the gripper 128. Thus, as illustrated in FIGS. 11*a*-11*b*, the feeder 130 is adapted to clamp or otherwise hold the blade 112 and move the blade toward the cutter 122 in the cutting chamber 120. Once a portion of the blade 112 has been processed in the cutting chamber 120, the feeder 130 may release or loosen its grip on the blade 112, move backwards along the feed direction F, clamp or otherwise hold the blade 112 at a second position, and move the blade 112 further toward the cutter 122 in the cutting chamber 120. In some embodiments, both the gripper 128 and the feeder 130 may be moveable along the feed direction F, such that coordinated movements and gripping and ungripping between the gripper 128 and the feeder 130 may feed the blade 112 into the cutting chamber 120 for processing.

One or both of the gripper 128 and the feeder 130 may comprise clamps, which may be hydraulically driven. These clamps may be adapted to crush or flatten the blade 112 prior to cutting by the cutter 122. This crushing or flattening of the blade 112 may provide a more compact surface area upon which the cutter 122 must act, thereby allowing for more cutting efficiency in processing the blade. In one aspect, the gripper 128 and/or the feeder 130 may be adapted to crush or flatten the blade 112 to a height of no more than 2 feet. This crushing or flattening may be provided by clamps able to apply significant pressure, sufficient to flatten the structure of the blade. As one example, the clamps may be capable of applying 80 tons of clamping force (although different clamping force may be used in association with different compositions of blade material to be flattened).

Figures 12A, 12B:
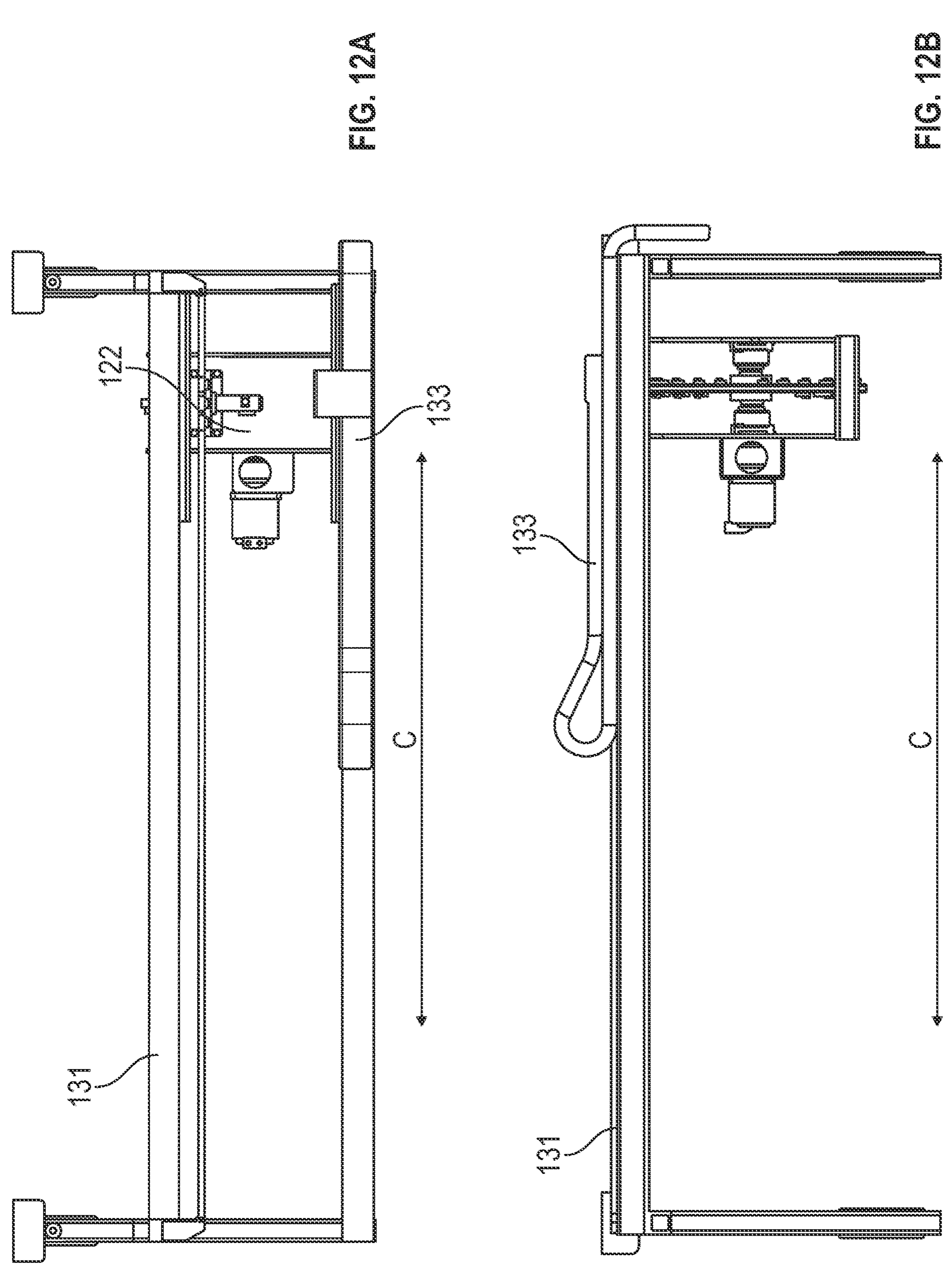
FIG. 12*a* is a top plan view of a cutter and cutter support of the system of FIG. 10.
FIG. 12*b* is a rear elevational view of the cutter and cutter support of FIG. 12*a;*

The cutter 122 may be adapted to travel in a cutting direction C so as to move along or across the blade 112 for processing. With further reference to FIGS. 12*a*-12*b*, the cutter 122 may be suspended or otherwise carried on or along a cutter support 131, such as a framework that may be present within the cutting chamber 120. The cutter support 131 may include one or more beams that may be adapted to extend in a longitudinal direction within the cutting chamber 120 and may be parallel to and define the cutting direction C. The cutter 122 may travel along these beams in the cutting direction C as described and illustrated herein. A drive 133 may be provided for driving or otherwise moving the cutter 122 along the cutter support 131 so as to engage and process the blade 112. In one aspect, the drive 133 may be a chain slide drive. In another aspect, the drive may be a cog belt driven by a hydraulic motor. The drive may be positioned at a top of the cutter support 131 so as to engage and drive the cutter 122 from above. A static chain may be attached to each end of the cutter support. A hydraulic motor and sprocket may pull the cutter along the chain back and forth.

Figure 13A:
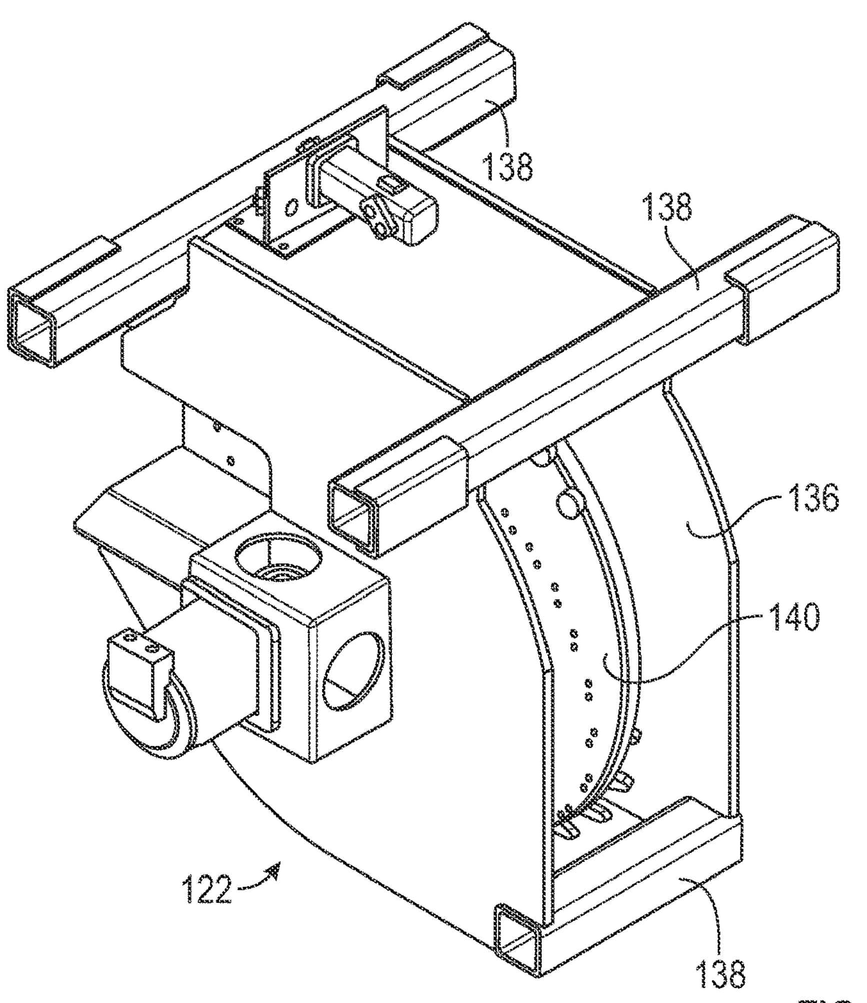
FIG. 13*a* is a rear perspective view of the cutter of the system of FIG. 10.
Figure 13B:
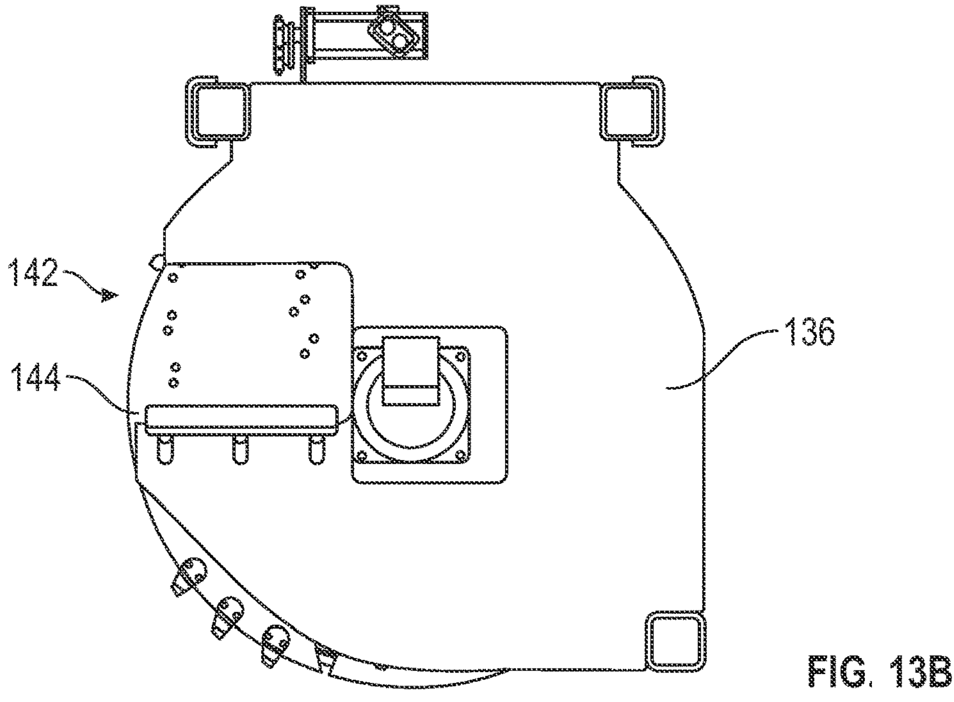
FIG. 13*b* is a side elevational view of the cutter of FIG. 13*a;*
Figure 13C:
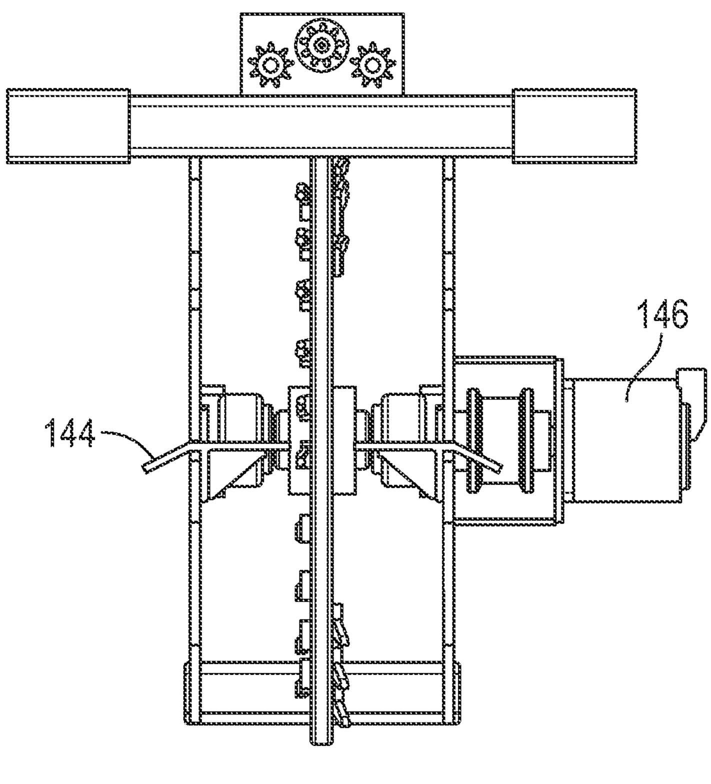
FIG. 13*c* is a front elevational view of the cutter of FIG. 13*a;*

Turning to FIGS. 13*a*-13*c*, the cutter 122 is illustrated in further detail. The cutter 122 may include a cutter head 140 at least partially housed by a cutter frame 136. The cutter head 140 may be rotated about an axis by a motor 146. In one aspect, the motor 146 may be controlled by a controller. The motor may comprise a hydraulic drive, such as one rated at 200-250 HP. The controller may be adapted to sense a load placed on the motor 146 based on the cutting of the blade 112. The controller may be further adapted to automatically adjust a rate of travel of the cutter 122 along the cutter support 131 so as to avoid overloading the motor 146 during processing of the blade 112.

The cutter head 140 may comprise a drum or a plate and may include one or more teeth, tips, or bits (collectively "teeth") on an outer surface of the cutter head. In one example, the cutter head 140 comprises a drum that is 5 feet in diameter with a 3 ton mass. As can be seen in the drawings, the teeth may be positioned on the lateral or axial side faces of the cutter head 140 so that movement of the cutter 122 across the blade 112 causes the teeth, tips, or bits to contact and shred the blade. These teeth, tips, or bits may include, but are not limited to, those illustrated and described in FIGS. 9*a*-9*e*. In a further example, the cutter head 140 may include enough teeth such that the cutter head 140 may exert a force of 25 HP/tooth in a 2'×2' cut.

The cutter frame 136 may include one or more connectors 138 for engaging with the cutter support 131. In one aspect, the connectors 138 may comprise receivers for receiving at least a portion of the cutter support 131. In one example, the connectors 138 may comprise beams or sections of beams adapted to nest or otherwise slide alone a length of the beams of the cutter support 131. For example, the connectors 138 may comprise arms that may fit inside of the beams of the cutter support, and may slide therewithin. One or more friction reducing elements may be included, such as rollers, wear pads, or a bearing or bearing surface to facilitate the movement of the cutter along the cutter support.

The cutter frame 136 may include a window 142 adapted to receive a portion of the blade 112 for processing. The window 142 may comprise an opening in the lateral sides of the cutter frame 136 that may expose at least a portion of the cutter head 140 to the blade 112. The frame 136 may further include a blade support 144 for supporting at least a portion of the blade 112 as it enters the window 142. The blade support 144 may take the form of a projection. This projection may extend in a lateral direction. In one aspect, the blade support 144 may include an inclined surface that may direct the blade into and through the window 142.

As the cutter 122 travels in the cutting direction C, the window 142 may allow the blade 112, fixed in position by one or more of the gripper 128 and the feeder 130, to make contact with the cutter head 140 through the window 142. As the blade 112 contacts the cutter head 140, the blade is shredded by the one or more teeth, tips, or bits on the cutter head 140.

Figure 14:
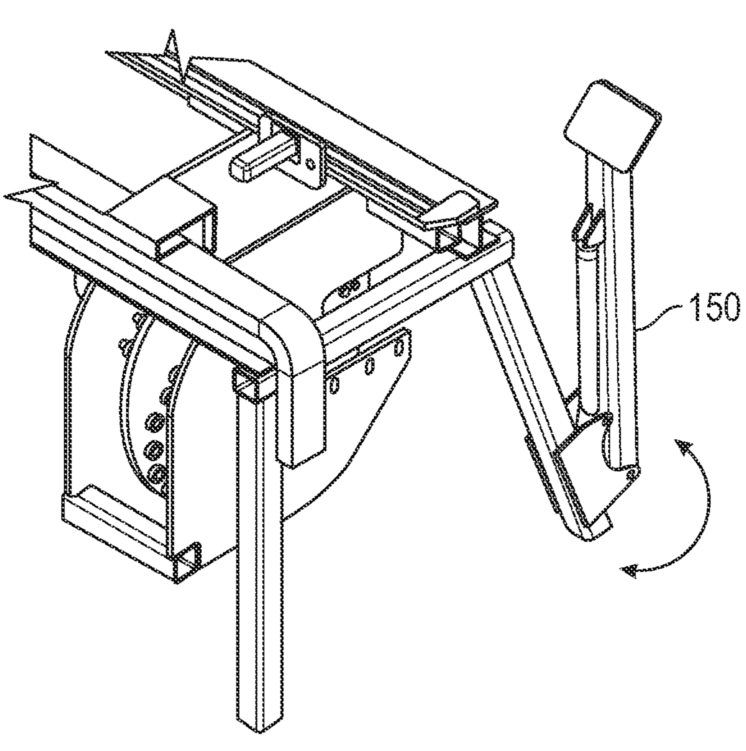
FIG. 14 is a rear perspective view of the cutter support and outrigger of the system of FIG. 10.
Figure 15:
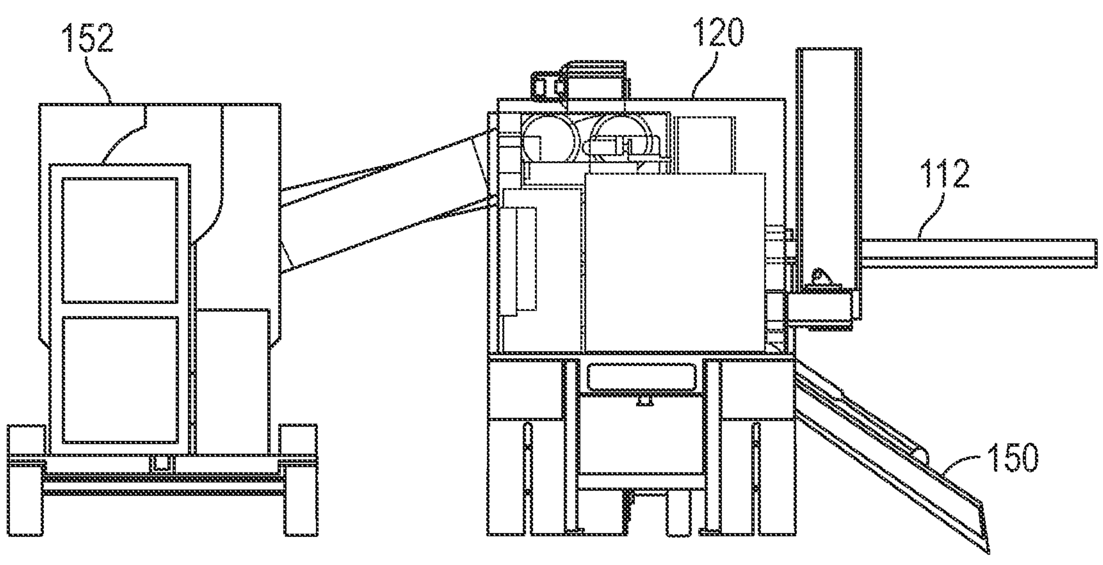
FIG. 15 is a side elevational view of the system of FIG. 10 with a dust collector.

With reference to FIG. 14 and FIG. 15, the system 100 may include one or more outriggers 150 adapted to prevent tipping of the system 100 or the mobile support 118 during use. Specifically, as a blade 112 is fed into the cutting chamber, the one or more outriggers 150 may be adapted to contact the ground so as to counterbalance the weight of the blade being supported by the gripper 128 and/or the feeder 130. The outriggers 150 may be pivotable (as shown in FIG. 14) or extendable and retractable so as to allow for contact with the ground when in use, and for stowing away when the outrigger is not in use. For example, one or more hydraulic cylinders or other actuators may be provided to effectuate pivoting of a portion of the outrigger 150 about a pivot point, or extension and retraction of a portion of the outrigger 150 along the length of the outrigger.

As shown in FIG. 15, one or more dust collectors 152 may be in communication with the cutting chamber 120 for collecting dust and small debris or other airborne particles and particulates from within the cutting chamber 120. The dust collector may comprise a reverse pulse filtration system for automatic filter cleaning. In a non-limiting example, the dust collector may be rated at between 15,000-20,000 cfm. The dust collector may comprise one or more filters rated for use with fine fiberglass dust. The cutting chamber 120 may include the vacuum system needed to create the dust collector, or a separate dust collector may be fluidly connected to the cutting chamber 120, such as via ductwork. The ductwork may be removable for easy transport.

Figure 16:
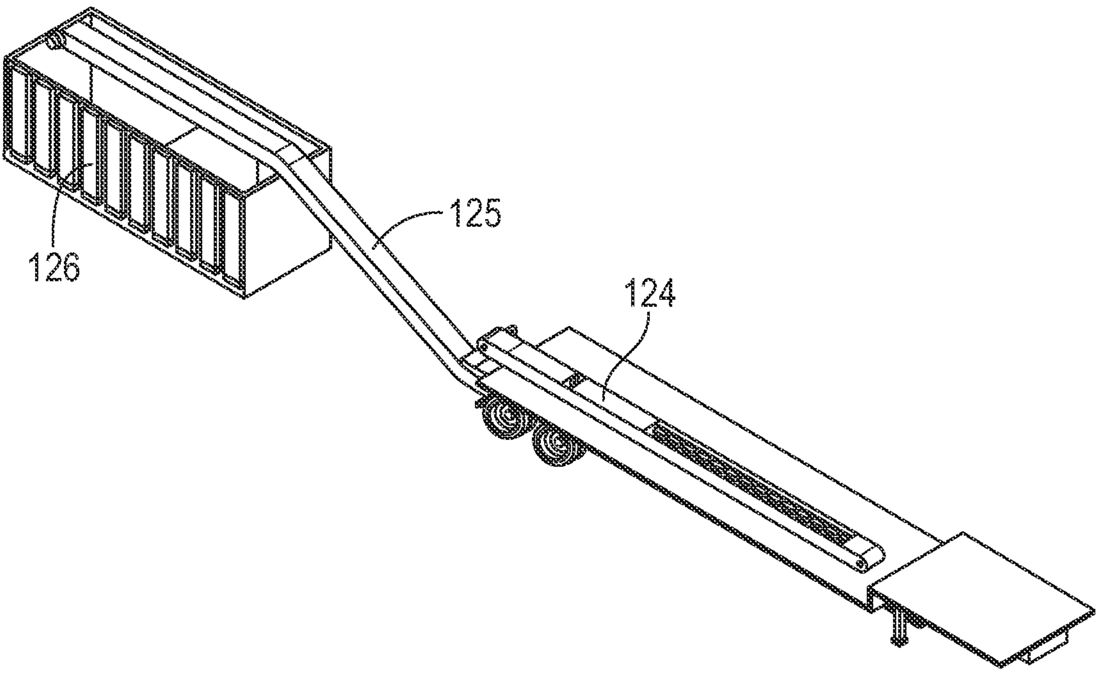
FIG. 16 is a perspective view of a conveyor system of the system of FIG. 10.

Larger particles resulting from the processing of a blade 112 within the cutting chamber 120 may fall to or through the bottom of the cutting chamber 120. In one aspect, a receptacle may be placed below the cutting chamber in order to directly collect these larger particles. In another aspect, as illustrated in FIGS. 10 and 16, a discharge conveyor 124 may be provided for conveying the larger particles from below or within the cutting chamber 120. In one embodiment, the discharge conveyor 124 may be at least partially within the cutting chamber 120, such as at or near a floor within the cutting chamber 120.

In other embodiments, the discharge conveyor 124 may be below the cutting chamber 120, such as on or near a surface of the mobile support 118. In these embodiments, the discharge conveyor 124 may be adapted to receive the larger particles, such as from an outlet at or near a floor of the cutting chamber, or a retractable base or an openable and closable aperture at the bottom of the cutting chamber, and carry these larger particles away. As illustrated in FIG. 16, the discharge conveyor may be in communication with an extension conveyor 125, which may carry the larger particles to the receptacle 126, which may be remote from the cutting chamber 120.

Each of the following terms written in singular grammatical form: "a", "an", and the", as used herein, means "at least one", or "one or more". Use of the phrase "one or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step (s), and does not preclude addition of one or more additional components), feature(s), characteristic(s), parameter(s), integer(s), step(s), or groups thereof. Each of these terms is considered equivalent in meaning to the phrase "consisting essentially of. Each of the phrases "consisting of and "consists of," as used herein, means "including and limited to."

The phrase "consisting essentially of," as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic being a system unit system sub-unit device, assembly, sub-assembly, mechanism, structure, component or element or, peripheral equipment utility, accessory, or material, step or procedure, sub-step or sub-procedure, but only if each such additional feature or characteristic does not materially alter the basic novel and inventive characteristics or special technical features, of the claimed item.

The term "method," as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

The invention claimed is:

1. A system for processing a used wind turbine blade comprising:

at least one gripper adapted to grip and hold the blade stationary;

at least one cutter adapted to shred the blade, said cutter comprising a plate, the plate including two lateral sides and a circumferential face, wherein the plate includes teeth on at least one lateral side of the plate;

a cutter support adapted to move the cutter with respect to the blade to process the blade; and a clamp adapted to move toward and away from the gripper in a feeding direction, said clamp adapted to clamp the blade and to feed the blade to the cutter in the feeding direction, wherein the feeding direction is perpendicular to a longitudinal direction of movement of the cutter.

2. The system of claim 1, wherein the cutter is housed within a cutting chamber.

3. The system of claim 2, further including a dust collector in communication with the cutting chamber for removing small particles from the air within the cutting chamber.

4. The system of claim 1, wherein the cutter support comprises at least one beam, and wherein the cutter is adapted to move along the beam as the cutter shreds the blade.

5. The system of claim 1, further including a drive for moving the cutter along the cutter support.

6. The system of claim 1, wherein the cutter comprises a cutter frame.

7. The system of claim 6, wherein the cutter frame comprises a window on a lateral side thereof, the window adapted to receive the blade as the cutter moves along the cutter support.

8. The system of claim 7, wherein the cutter frame comprises a blade support adapted to guide the blade into the window as the cutter moves along the cutter support.

9. The system of claim 1, further including an actuator adapted to move the clamp with respect to the gripper.

10. The system of claim 1, wherein the gripper is an actuable clamp.

11. The system of claim 1, further including a discharge conveyor adapted to receive processed pieces of the blade from the cutter and transport said processed pieces to a receptacle.

12. The system of claim 1, further including a mobile support for supporting and transporting the cutter and the cutter support.

13. The system of claim 1, wherein the gripper comprises a hydraulic clamp adapted to crush or flatten the blade prior to cutting by the cutter.

* * * * *